(12) United States Patent
Jung

(10) Patent No.: US 11,025,100 B2
(45) Date of Patent: Jun. 1, 2021

(54) WIRELESS POWER TRANSMISSION/RECEPTION DEVICE

(71) Applicant: GE Hybrid Technologies, LLC, Niskayuna, NY (US)

(72) Inventor: Chun Kil Jung, Seoul (KR)

(73) Assignee: GE Hybrid Technologies, LLC, Niskayuna, NY (US)

( * ) Notice: Subject to any disclaimer, the term of this patent is extended or adjusted under 35 U.S.C. 154(b) by 0 days.

(21) Appl. No.: 16/711,846

(22) Filed: Dec. 12, 2019

(65) Prior Publication Data

US 2020/0119596 A1    Apr. 16, 2020

Related U.S. Application Data

(63) Continuation of application No. 15/555,544, filed as application No. PCT/KR2016/001858 on Feb. 25, 2016, now Pat. No. 10,547,215.

(30) Foreign Application Priority Data

Mar. 5, 2015    (KR) .......................... 10-2015-0031039

(51) Int. Cl.
*H02J 50/70*    (2016.01)
*H01F 38/14*    (2006.01)
(Continued)

(52) U.S. Cl.
CPC .............. *H02J 50/70* (2016.02); *H01F 27/36* (2013.01); *H01F 38/14* (2013.01); *H02J 7/02* (2013.01); *H02J 50/12* (2016.02)

(58) Field of Classification Search
None
See application file for complete search history.

(56) References Cited

U.S. PATENT DOCUMENTS

| 8,968,603 B2 * | 3/2015 | Krishna | ................ C04B 35/462 252/500 |
| 9,130,395 B2 * | 9/2015 | Jung | ....................... H02J 5/005 |

(Continued)

FOREIGN PATENT DOCUMENTS

| JP | 05275920 | 10/1993 |
| KR | 1020120124646 | 11/2012 |

(Continued)

OTHER PUBLICATIONS

"PCT Application No. PCT/KR2016/001858 Internation Search Report", dated May 25, 2016, 2 pages.
(Continued)

*Primary Examiner* — Lincoln D Donovan
*Assistant Examiner* — Khareem E Almo
(74) *Attorney, Agent, or Firm* — DeLizio Law, PLLC

(57) ABSTRACT

The present description relates to a wireless power transmission/reception device. The present description provides a magnetic field controlling member for focusing a magnetic field between a primary coil, which is connected to a power source of a wireless power transmission system and forms a magnetic field, and a secondary coil which is for receiving power by means of the magnetic field. The magnetic field controlling member includes: a substrate, between the primary coil and secondary coil, of which one side faces the primary coil or secondary coil; a pattern unit which is placed on the substrate and has a plurality of thin films that are positioned at a predetermined distance away from each other; and a connecting unit which electrically connects the plurality of thin films.

20 Claims, 8 Drawing Sheets

(51) Int. Cl.
  *H02J 7/02* (2016.01)
  *H01F 27/36* (2006.01)
  *H02J 50/12* (2016.01)

(56) References Cited

U.S. PATENT DOCUMENTS

| | | | |
|---|---|---|---|
| 10,131,237 B2* | 11/2018 | Salter | H01Q 7/00 307/104 |
| 2010/0181843 A1* | 7/2010 | Schatz | B60L 53/665 307/104 |
| 2010/0201203 A1* | 8/2010 | Schatz | H01Q 7/00 307/104 |
| 2010/0219694 A1* | 9/2010 | Kurs | H02J 50/12 307/104 |
| 2011/0234010 A1 | 9/2011 | Bohori et al. | |
| 2011/0279214 A1* | 11/2011 | Lee | H01F 17/08 336/220 |
| 2012/0223573 A1* | 9/2012 | Schatz | H02J 7/0029 307/9.1 |
| 2013/0002038 A1* | 1/2013 | Lee | H02J 50/12 307/104 |
| 2013/0193770 A1* | 8/2013 | Krishna | C08K 3/22 307/104 |
| 2014/0159502 A1 | 6/2014 | Shimokawa et al. | |
| 2014/0225453 A1 | 8/2014 | Bae | |
| 2015/0045227 A1* | 2/2015 | Ahn | H02J 50/70 505/163 |
| 2015/0054457 A1* | 2/2015 | Kim | H01F 27/2823 320/108 |
| 2016/0064814 A1* | 3/2016 | Jang | H01Q 7/04 343/842 |
| 2016/0118179 A1* | 4/2016 | Park | H01F 38/14 320/108 |
| 2016/0141884 A1* | 5/2016 | Lee | C04B 35/462 252/500 |
| 2017/0018954 A1* | 1/2017 | Lee | B60L 53/665 307/104 |
| 2018/0198310 A1* | 7/2018 | Hwang | C08K 3/22 307/104 |

FOREIGN PATENT DOCUMENTS

| | | |
|---|---|---|
| KR | 1020130087452 | 8/2013 |
| KR | 1020140129930 | 11/2014 |
| KR | 1020150017814 | 2/2015 |
| WO | 2012150746 | 8/2012 |
| WO | 2016140463 | 9/2016 |

OTHER PUBLICATIONS

"PCT Application No. PCT/KR2016/001858 International Preliminary Report on Patentability", dated Sep. 15, 2017, 7 pages.

"PCT Application No. PCT/KR2016/001858 Written Opinion", dated May 25, 2016, 6 pages.

"Qi System Description Wireless Power Transfer", Wireless Power Consortium, vol. 1:Low Power, Part 1:Interface Definition, Version 1.0.1, Oct. 2010, 88 pages.

"U.S. Appl. No. 15/555,544 Office Action", dated Jan. 4, 2019, 11 pages.

"Korean Application No. 10-2015-0031039 Notification of Reason for Refusal", dated Mar. 5, 2021, 3 pages.

* cited by examiner

WIRELESS POWER TRANSMISSION/RECEPTION DEVICE

CROSS-REFERENCE TO RELATED APPLICATIONS

This application is a Continuation of and claims the priority benefit of U.S. patent application Ser. No. 15/555,544, filed Sep. 4, 2017, which is a 371 National Phase Application and claims the priority benefit of PCT Application No. PCT/KR2016/001858, filed Feb. 25, 2016, which claims the benefit of priority to Korean Patent Application No. 10-2015-0031039, filed Mar. 5, 2015, the disclosures of which are incorporated herein by reference.

TECHNICAL FIELD

The present invention relates to wireless charging, and more particularly, to a magnetic field controlling member for focusing a magnetic field between a wireless power transmitter and a wireless power receiver.

BACKGROUND ART

The wireless power transfer technology is a technology that wirelessly delivers power between a power source and an electronic device. For example, the wireless power transfer technology enables a battery of a wireless terminal to be charged by simply placing a wireless terminal such as a smart phone or a tablet on a wireless charging pad. Thus, compared to a wired charging environment using a typical wired charging connector, the mobility, convenience, and safety can be improved. In addition to wireless charging of wireless terminals, the wireless power transfer technology is attracting attention as a substitute for the existing wired power transfer environment in various fields such as electric vehicles, wearable devices such as Bluetooth earphones or 3D glasses, home appliances, furniture, underground facilities, buildings, medical devices, robots, and leisure.

The wireless power transfer method is also referred to as a contactless power transfer method, a no point of contact power transfer method, or a wireless charging method. The wireless power transfer system includes a wireless power transfer apparatus for supplying electric energy by a wireless power transfer method and a wireless power receiving apparatus for receiving electric energy wirelessly supplied from the wireless power transfer apparatus and supplying power to a power receiving device such as a battery cell.

The wireless power transfer technologies are largely classified into a magnetic induction method and a magnetic resonance method. In the magnetic induction method, energy is transmitted using a current induced at a receiving side coil due to a magnetic field generated in a coil battery cell at a transmitting side in accordance with electromagnetic coupling between a coil at the transmitting side and a coil at the receiving side. The magnetic induction type of wireless power transfer technology has an advantage of high transmission efficiency, but has limitations in that the power transfer distance is limited to several millimeters and the degrees of the location freedom is significantly low due to sensitivity to matching between coils.

The magnetic resonance method is similar to the magnetic induction method in that both methods use a magnetic field. However, in the magnetic resonance method, a resonance occurs when a specific resonance frequency is applied to the coil at the transmission side and the coil at the reception side, and thus energy is transferred by a phenomenon that the magnetic field is focused on both ends of the transmission side and the reception side, which differs from magnetic induction method in terms of energy transfer. Due to these characteristics of magnetic resonance, power can be remotely transmitted unlike magnetic induction. The magnetic resonance method may transmit energy up to a relatively long distance of several tens of centimeters to several meters compared to the magnetic induction method, and enables power transmission to a plurality of devices at the same time. Thus, the magnetic resonance method is expected to be a wireless power transfer technology to implement cord-free.

DISCLOSURE

Technical Problem

The present invention provides a wireless power receiver/transmitter with less noise and improved transmission efficiency.

Technical Solution

According to an aspect of the present invention, there is provided a magnetic field control member for focusing a magnetic field between a primary coil connected to a power source of a wireless power transfer system and forming a magnetic field and a secondary coil receiving power through the magnetic field, the member including: a substrate having one surface disposed between the primary coil and the secondary coil so as to face the primary coil or the secondary coil; a pattern unit disposed over the substrate and including a plurality of thin films spaced apart from each other by a certain interval; and a connection unit electrically connecting the plurality of thin films.

The magnetic field control member may allow a magnetic field formed from the primary coil to be focused on the secondary coil.

The plurality of thin films may have a linear shape with the same length.

The plurality of thin films may be spaced from each other at the same interval.

The interval of the plurality of thin films may be about 1 mm.

The pattern unit may be formed of copper or a mixture or compound containing copper.

The connection unit may electrically connect one ends of the plurality of thin films to each other.

The connection unit may electrically connect both ends of the plurality of thin films to each other.

The connection unit may be electrically connected by a conductive material formed of one of gold, copper, and aluminum, or a mixture of two or more thereof.

According to another aspect of the present invention, there is provided a wireless power transmitter including: a transmitting antenna forming a magnetic field; and a magnetic field control member having one surface thereof facing the transmitting antenna or a wireless power receiver that receives power through the magnetic field, wherein the magnetic field control member includes: a substrate; a pattern unit formed over the substrate and including a plurality of thin films spaced apart from each other by a certain interval; and a connection unit electrically connecting the plurality of thin films.

According to another aspect of the present invention, there is provided a wireless power receiver including: a receiving antenna for receiving power through a magnetic field formed from a wireless power transmitter; and a magnetic field control member having one surface thereof facing the receiving antenna or a wireless power transmitter, wherein the magnetic field control member includes: a substrate; a pattern unit formed over the substrate and including a plurality of thin films spaced apart from each other by a certain interval; and a connection unit electrically connecting the plurality of thin films.

Advantageous Effects

According to the embodiments, the magnetic field generated in the primary coil can be focused on the secondary coil, and the coupling of the primary coil and the secondary coil can be improved, thereby providing a wireless charging system with reduced noise and improved efficiency.

BEST MODES

The term 'wireless power' below is used to mean any type of energy associated with an electric field, a magnetic field, and an electromagnetic field transmitted from a transmitter to a receiver without the use of physical electromagnetic conductors. The wireless power may also be referred to as a power signal, and may denote an oscillating magnetic flux enclosed by the primary and secondary coils. For example, power conversion in a system to wirelessly charge devices including mobile phones, cordless phones, iPods, MP3 players, headsets and the like will be described herein. In general, the basic principles of wireless power transfer include, for example, both magnetic induction method and magnetic resonance method.

Figure 1:
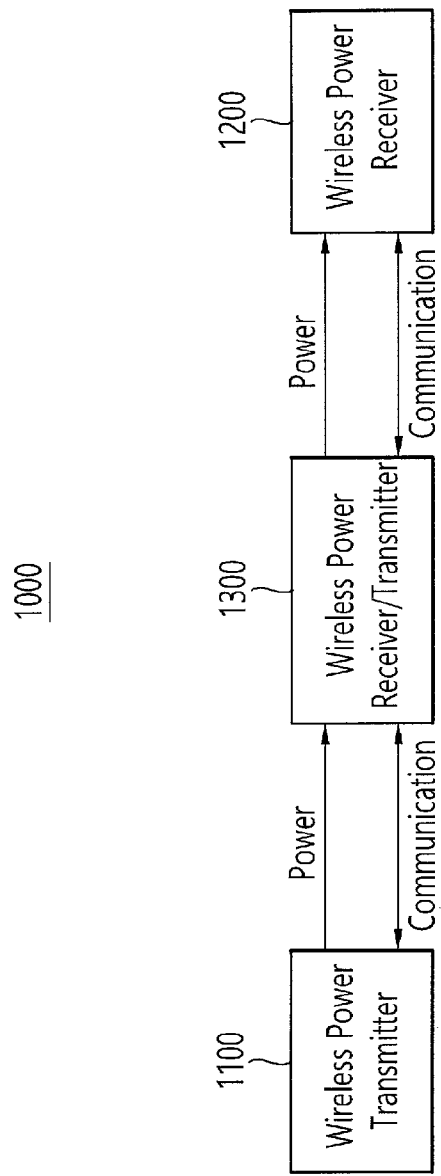
FIG. 1 is a view illustrating a wireless power system according to an embodiment of the present invention.

FIG. 1 is a view illustrating a wireless power system 1000 according to an embodiment of the present invention.

Referring to FIG. 1, a wireless power system 1000 includes a wireless power transmitter 1100, a wireless power receiver 1200, and a wireless power receiver/transmitter 1300. The wireless power system 1000 may wirelessly transmit power using a magnetic field. The wireless transmission of electric power may be performed using a magnetic induction method or a magnetic resonance method. In this case, the wireless transmission of electric power may be performed between a transmitting antenna 1120 of the wireless power transmitter 1100 and a receiving antenna 1210 of the wireless power receiver 1200.

The wireless power transmitter 1100 receives power from an external power source S, and generates a magnetic field. The wireless power receiver 1200 generates a current using the generated magnetic field, and wirelessly receives power. The wireless power receiver/transmitter 1300 may wirelessly receive power using the generated magnetic field similarly to the wireless power receiver 1200. Also, the wireless power receiver/transmitter 1300 may generate a magnetic field similarly to the wireless power transmitter 1100. In this case, the wireless power receiver/transmitter 1300 may generate a magnetic field using power stored in a battery instead of an external power source. The wireless power receiver/transmitter 1300 may be a relay or a repeater for increasing the wireless power transfer distance. As the repeater, a passive type of resonance loop implemented with an LC circuit may be used. Such a resonance loop may focus a magnetic field radiated into the atmosphere, and may increase the wireless power transfer distance. It is also possible to secure a wider wireless power transfer coverage using several repeaters at the same time.

Thus, in the wireless power system 1000 as shown in FIG. 1, power may be transmitted from the wireless power transmitter 1100 to the wireless power receiver/transmitter 1300, and the wireless power receiver/transmitter 1300 may again deliver power to the wireless power receiver 1200.

Also, in the wireless power system 1000, the wireless power transmitter 1100, the wireless power receiver 1200, and the wireless power receiver/transmitter 1300 may transmit/receive various kinds of information required for wireless power transfer. Here, the communication among the wireless power transmitter 1100, the wireless power receiver 1200, and the wireless power receiver/transmitter 1300 may be performed according to one of an in-band communication method that uses a magnetic field used for wireless power transfer and an out-band communication method that uses a separate communication carrier.

Here, the wireless power transmitter 1100 may be provided as a fixed type or a movable type. Examples of the fixed type include a form embedded into a ceiling or wall of a room or furniture such as a table, a form implanted in an outdoor parking lot, a bus stop or a subway station, and a form installed in a vehicle such as a car or a train. The wireless power transmitter 1100 that is a movable type may be implemented as a mobile device having a movable weight or size, or a part of other devices such as a cover of a notebook computer.

Also, the wireless power receiver 1200 and the wireless power receiver/transmitter 1300 should be interpreted as a comprehensive concept including various kinds of electronic devices equipped with batteries and various kinds of home appliances that are supplied with power wirelessly instead of power cables and are operated. Representative examples of the wireless power receiver 1200 include portable terminals, cellular phones, smart phones, Personal Digital Assistants (PDAs), Portable Media Player (PMPs), Wibro terminals, tablets, phablets, notebooks, digital cameras, navigation terminals, televisions, and Electronic Vehicles (EVs).

In the wireless power system 1000, the wireless power receiver 1200 and the wireless power receiver/transmitter 1300 may be disposed in singularity or plurality. In FIG. 1, the wireless power transmitter 1100, the wireless power receiver 1200, and a wireless power receiver/transmitter 1300 are illustrated as transmitting/receiving power in a one-to-one manner, but one wireless power transmitter 1100 may also deliver power to a plurality of wireless power receivers 1200 or a plurality of wireless power receiver/transmitters 1300. Particularly, in the case of performing wireless power transfer by the magnetic resonance method, one wireless power transmitter 1100 may simultaneously deliver power to a plurality of wireless power receivers 1200 and a plurality of wireless power receiver/transmitters 1300 by applying a simultaneous transmission method or a time division transmission method.

Also, in FIG. 1, the wireless power transmitter 1100 is illustrated as delivering power to the wireless power receiver/transmitter 1300, and the wireless power receiver/transmitter 1300 is illustrated as delivering power to the wireless power receiver 1200, but the wireless power transmitter 1100 may directly deliver power to the wireless power receiver 1200 or to both the wireless power receiver 1200 and the wireless power receiver/transmitter 1300.

Hereinafter, the wireless power transmitter 1100 and the wireless power receiver 1200 according to an embodiment of the present invention will be described.

Figure 2:
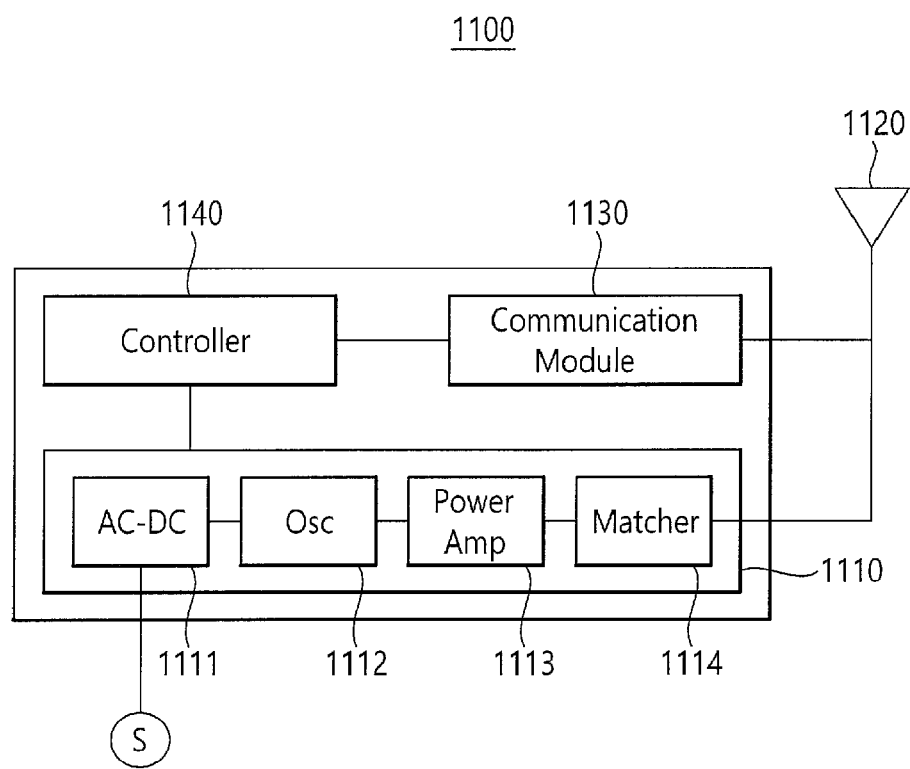
FIG. 2 is a view illustrating a wireless power transmitter according to an embodiment of the present invention.

FIG. 2 is a view illustrating a wireless power transmitter 1100 according to an embodiment of the present invention.

Referring to FIG. 2, the wireless power transmitter 1100 may include a power transmission module 1110, a transmitting antenna 1120, a communication module 1130, and a controller 1140.

The power transmission module 1110 may generate transmission power using a power source applied from an external power source S. The power transmission module 1110 may include an AC-DC converter 1111, a frequency oscillator 1112, a power amplifier 1113, and an impedance matcher 1114.

The AC-DC converter 1111 may convert AC power to DC power. The AC-DC converter 1111 receives AC power from the external power source S, and converts the waveform of the inputted AC power into DC power, and outputs DC power. The AC-DC converter 1111 may adjust a voltage value of the outputted DC power.

The frequency oscillator 1112 may convert DC power into AC power of a specific frequency that is desired. The frequency oscillator 1112 receives DC power outputted from the AC-DC converter 1111, and converts the received DC power into AC power of a specific frequency to output the converted AC power. Here, the specific frequency may be a resonance frequency. In this case, the frequency oscillator 1112 may output AC power of the resonance frequency. Naturally, the frequency oscillator 1112 does not necessarily oscillate the resonance frequency.

The power amplifier 1113 may amplify a voltage or current of power.

The power amplifier 1113 receives AC power of a specific frequency outputted from the frequency oscillator 1112, and amplifies the voltage or current of the inputted AC power of the specific frequency to output the amplified voltage or current.

The impedance matcher 1114 may perform impedance matching. The impedance matcher 1114 may include a capacitor, an inductor, and a switching element for switching the connection of the capacitor and the inductor. The impedance matching may be performed by detecting a reflection wave of wireless power transmitted through the transmitting antenna 1120 and switching the switching element based on the detected reflection wave to adjust the connection state of the capacitor or the inductor, adjust the capacitance of the capacitor, or adjust the impedance of the inductor. According to circumstances, the impedance matcher 1114 may be omitted, and the present disclosure also includes embodiments of the wireless power transmitter 1100 from which the impedance matcher 1114 is omitted.

The transmitting antenna 1120 may generate an electromagnetic field using AC power. The transmitting antenna 1120 may receive AC power of a specific frequency outputted from the power amplifier 1113, and may generate a magnetic field of a specific frequency. The generated magnetic field is radiated, and the wireless power receiver 1200 receives the magnetic field to generate a current. In other words, the transmitting antenna 1120 wirelessly transmits power.

When the magnetic induction method is used, the transmitting antenna 1120 or the receiving antenna 1210 may have any suitable forms as a coil structure, and may be a copper wire wound around formation having a high permeability, such as ferrite or amorphous metal. The transmitting antenna 1120 may be referred to as a primary coil, a primary core, a primary winding, or a primary loop antenna. On the other hand, the receiving antenna 1210 may be referred to as a secondary coil, a secondary core, a secondary winding, a secondary loop antenna, or a pickup antenna.

When the magnetic resonance method is used, the transmitting antenna 1120 and the receiving antenna 1210 may be provided in a form of resonance antenna, respectively. The resonance antenna may have a resonant structure including a coil and a capacitor. In this case, the resonance frequency of the resonance antenna is determined by the inductance of the coil and the capacitance of the capacitor. Here, the coil may be configured in a form of loop. Also, a core may be disposed inside the loop. The core may include a physical core such as a ferrite core, or may include an air core.

The energy transfer between the transmitting antenna 1120 and the receiving antenna 1210 may be performed through a resonance phenomenon of a magnetic field. The resonance phenomenon refers to a phenomenon in which when a near-field corresponding to the resonance frequency is generated in one resonance antenna and another resonance antenna is located therearound, both resonance antennas are coupled to each other and thus high efficient energy transfer occurs between the resonance antennas. When a magnetic field corresponding to a resonance frequency occurs between the resonance antenna of the transmitting antenna 1120 and the resonance antenna of the receiving antenna 1210, a phenomenon occurs in which the resonance antennas of the transmitting antenna 1120 and the receiving antenna 1210 resonate with each other. Accordingly, the magnetic field may be generally focused toward the receiving antenna 1210 with higher efficiency than a case where the magnetic field generated by the transmitting antenna 1120 is radiated to the free space and thus energy may be delivered with high efficiency from the transmitting antenna 1120 to the receiving antenna 1210. The magnetic induction method may be implemented similarly to the magnetic resonance method, but in this case, the frequency of the magnetic field need not be a resonance frequency. Instead, in the magnetic induction method, matching between the loops constituting the receiving antenna 1210 and the transmitting antenna 1120 is needed, and an interval between the loops need to be very close.

On the other hand, although not shown in FIG. 2, the wireless power transmitter 1100 may further include a communication antenna. The communication antenna may transmit and receive a communication signal using a communication carrier except the magnetic field communication. For example, the communication antenna may transmit and receive communication signals such as Wi-Fi, Bluetooth, Bluetooth LE, ZigBee, and NFC.

The communication module 1130 may transmit and receive information to and from the wireless power receiver 1200 or the wireless power receiver/transmitter 1300. The communication module 1130 may include at least one of an in-band communication module or an out-band communication module.

The in-band communication module may transmit and receive information using a magnetic wave having a specific frequency as a center frequency. For example, the communication module 1130 may perform in-band communication by transmitting a magnetic wave containing information through the transmitting antenna 1120 or by receiving a magnetic wave containing information through the transmitting antenna 1120. In this case, information may be contained in a magnetic wave or a magnetic wave containing information may be interpreted using a modulation method such as Binary Phase Shift Keying (BPSK) or Amplitude Shift Keying (ASK) and a coding method such as a Manchester coding or non-return-to-zero level (NZR-L) coding. When this in-band communication is used, the communication module 1130 may transmit and receive information up to several meters in a data transmission rate of several kbps.

The out-band communication module may perform out-band communication through the communication antenna. For example, the communication module 1130 may be provided as a short-range communication module. Examples of short-range communication modules include communication modules such as Wi-Fi, Bluetooth, Bluetooth LE, ZigBee, and NFC.

The controller 1140 may control the overall operation of the wireless power transmitter 1100. The controller 1140 may perform calculation and processing of various kinds of information, and may control each component of the wireless power transmitter 1100.

The controller 1140 may be implemented in a computer or a device similar thereto using hardware, software, or a combination thereof. In terms of hardware, the controller 1140 may be provided in a form of electronic circuit that processes electrical signals to perform control functions, and in terms of software, may be provided in a form of a program that drives the hardware controller 1140.

Hereinafter, the wireless power receiver 1200 according to an embodiment of the present invention will be described.

Figure 3:
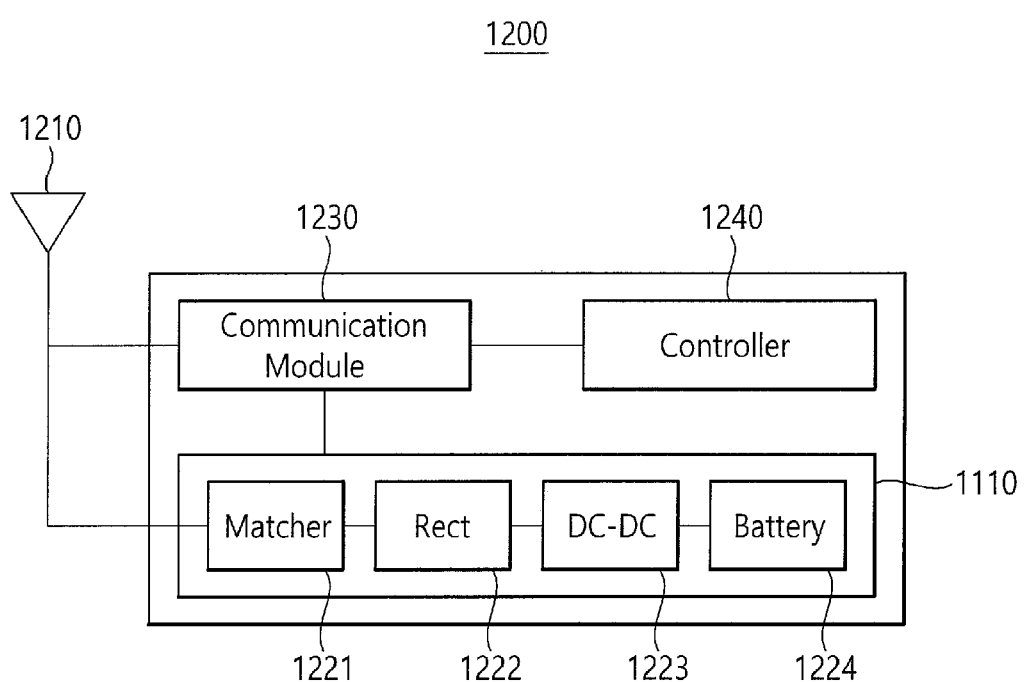
FIG. 3 is a view illustrating a wireless power receiver according to an embodiment of the present invention.

FIG. 3 is a view illustrating a wireless power receiver 1200 according to an embodiment of the present invention.

Referring to FIG. 3, the wireless power receiver 1200 may include a receiving antenna 1210, a power reception module 1220, a communication module 1230, and a controller 1240. The wireless power receiver 1200 may wirelessly receive power.

The receiving antenna 1210 may receive wireless power transmitted from the wireless power transmitter 1100 or the wireless power receiver/transmitter 1300. The receiving antenna 1210 may receive power using a magnetic field that is emitted by the transmitting antenna 1120. Here, when a specific frequency is a resonance frequency, a magnetic resonance phenomenon may occur between the transmitting antenna 1120 and the receiving antenna 1210, thereby enabling more efficient power transfer.

The power reception module 1220 may charge or drive the wireless power receiver 1200 using power received by the receiving antenna 1210. The power reception module 1220 may include an impedance matcher 1221, a rectifier 1222, a DC-DC converter 1223, and a battery 1224.

The impedance matcher 1221 may adjust the impedance of the wireless power receiver 1200. The impedance matcher 1221 may include a capacitor, an inductor, and a switching element that switches a combination thereof. The matching of the impedances may be performed by controlling the switching element of the circuit constituting the impedance matcher 1221 based on a voltage value or a current value, a power value, and a frequency value of wire power that is received. According to circumstances, the impedance matcher 1221 may be omitted, and the present disclosure also includes embodiments of the wireless power receiver 1200 from which the impedance matcher 1221 is omitted.

The rectifier 1222 may rectify the received wireless power, and may convert the rectified power from AC to DC. The rectifier 1222 may convert AC into DC using a diode or a transistor, and may smooth DC using a capacitor and a resistor. As the rectifier 1222, a full-wave rectifier, a half-wave rectifier, and a voltage multiplier implemented by a bridge circuit, etc. may be used.

The DC-DC converter 1223 may convert the rectified DC power voltage into a desired level, and output the converted DC power. When the voltage value of the DC power source rectified by the rectifier 1222 is larger or smaller than the voltage value required for charging a battery or driving an electronic device, the DC-DC converter 1223 may change the voltage value of the rectified DC power source into a desired voltage.

The battery 1224 may store energy using power outputted from the DC-DC converter 1223. On the other hand, the battery 1224 is not necessarily included in the wireless power receiver 1200. For example, the battery may be provided as an external configuration of a detachable form. As another example, the wireless power receiver 1200 may include a driving unit for driving various operations of an electronic device instead of the battery 1224.

On the other hand, although not shown in FIG. 3, the wireless power receiver 1200 may further include a communication antenna. The communication antenna may transmit and receive a communication signal using a communication carrier except the magnetic field communication. For example, the communication antenna may transmit and receive communication signals such as Wi-Fi, Bluetooth, Bluetooth LE, ZigBee, and NFC.

The communication module 1230 may transmit and receive information to and from the wireless power transmitter 1100 or the wireless power receiver/transmitter 1300. The communication module 1230 may include at least one of an in-band communication module or an out-band communication module.

The in-band communication module may transmit and receive information using a magnetic wave having a specific frequency as a center frequency. For example, the communication module 1230 may perform in-band communication by transmitting a magnetic wave containing information through the receiving antenna 1210 or by receiving a magnetic wave containing information through the receiving antenna 1210. In this case, information may be contained in a magnetic wave or a magnetic wave containing information may be interpreted using a modulation method such as Binary Phase Shift Keying (BPSK) or Amplitude Shift Keying (ASK) and a coding method such as a Manchester coding or non-return-to-zero level (NZR-L) coding. When this in-band communication is used, the communication module 1230 may transmit and receive information up to several meters in a data transmission rate of several kbps.

The out-band communication module may perform out-band communication through the communication antenna. For example, the communication module 1230 may be provided as a short-range communication module.

Examples of short-range communication modules include communication modules such as Wi-Fi, Bluetooth, Bluetooth LE, ZigBee, and NFC.

The controller 1240 may control the overall operation of the wireless power receiver 1200. The controller 1240 may perform calculation and processing of various kinds of information, and may control each component of the wireless power receiver 1200.

The controller 1240 may be implemented in a computer or a device similar thereto using hardware, software, or a combination thereof. In terms of hardware, the controller 1240 may be provided in a form of electronic circuit that processes electrical signals to perform control functions, and in terms of software, may be provided in a form of a program that drives the hardware controller 1240.

Figure 4:
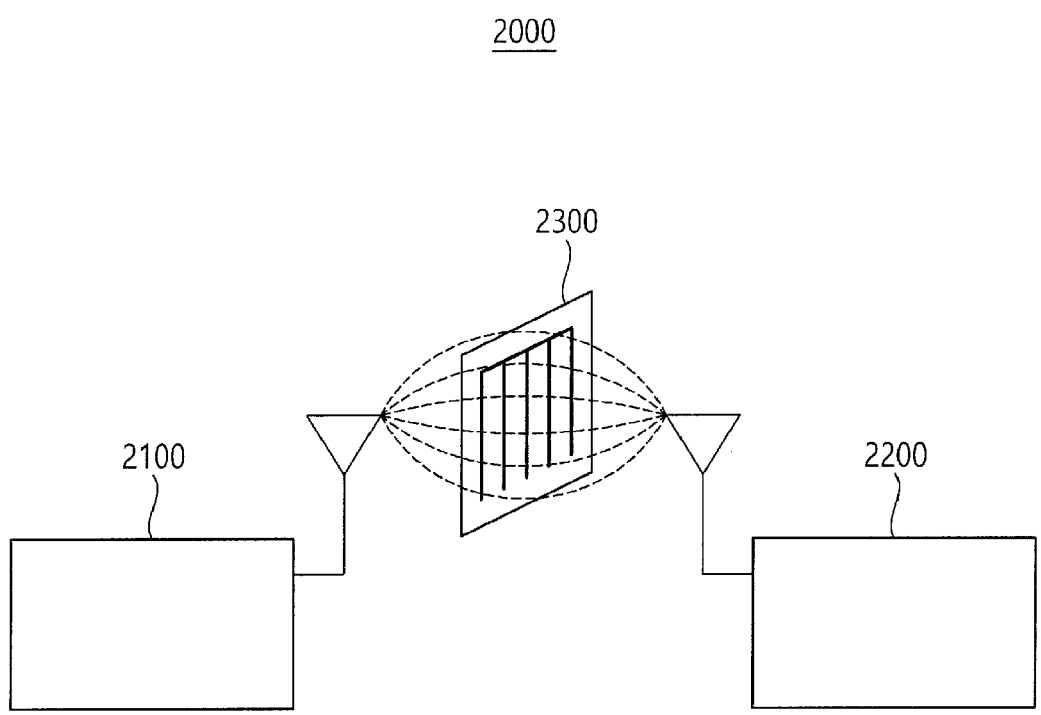
FIG. 4 is a schematic view illustrating a wireless charging system according to an embodiment the present invention.

FIG. 4 is a schematic view illustrating a wireless charging system according to an embodiment the present invention. Referring to FIG. 4, a wireless power system 2000 according to an embodiment includes a wireless power transmitter 2100, a wireless power receiver 2200, and a magnetic control member 2300.

The wireless power transmitter 2100 may wireless transmit power, and although not shown, may include a power transmission module 2110, a transmitting antenna 2120, a communication module 2130, and a controller 2140. The respective components may perform the same or similar functions as the power transmission module 1110, the transmitting antenna 1120, the communication module 1130, and the controller 1140 of FIG. 2.

The transmitting antenna 2120 may include a primary coil, and may generate an electromagnetic field.

Also, the wireless power receiver 2200 may wirelessly receive power, and although not shown, may include a receiving antenna 2210, a power reception module 2220, a communication module 2230, and a controller 2240. The respective components may perform the same or similar functions as the power reception module 1220, the communication module 1230, and the controller 1240 of FIG. 3.

The receiving antenna 2210 may include a secondary coil, and may receive power from the wireless power transmitter 2100 through a magnetic field generated from the transmitting antenna 2120.

The magnetic field control member 2300 is disposed between the primary coil 2120 of the wireless power transmitter 2100 and the secondary coil 2210 of the wireless power receiver 2200 as shown in FIG. 4, i.e., at a magnetic field path of the primary coil 2120 and the secondary coil 2210, and may be disposed such that one surface thereof faces the primary coil 2120 or the secondary coil 2210.

Also, the magnetic field control member 2300 may be disposed such that one surface thereof faces the primary coil 2120 and the opposite surface thereof faces the secondary coil 2210.

In addition, the magnetic field control member 2300 may be disposed adjacent to the primary coil 2120 so as to be coupled to the wireless power transmitter 2100, or may be disposed adjacent to the secondary coil 2210 so as to be coupled to the wireless power receiver 2200.

In a typical wireless charging system, since the size of the primary coil is relatively much larger than the size of the secondary coil, a magnetic field formed from the primary coil is not intensively transmitted to the secondary coil, but widely reaches the periphery of the secondary coil. Thus, the electronic devices or parts around the secondary coil may receive an undesired magnetic field, thereby causing malfunction of the peripheral electronic devices.

The magnetic field control member 2300 may allow the magnetic field formed in the primary coil 2120 to be focused on the secondary coil 2210, thereby reducing a power loss, improving the charging efficiency, and reducing an influence of the magnetic field on parts other than the secondary coil 2210. For this, a repeater or relay function is provided in a region where the secondary coil 2210 is located on the magnetic control member 2300 in a path through which the magnetic field formed in the primary coil 2120 moves to the secondary coil 2210, and on the other hand, a magnetic field interruption function is provided in a region where the secondary coil 2210 is not located on the magnetic control member 2300 in a path through which the magnetic field formed in the primary coil 2120 moves to the secondary coil 2210. Thus, it is possible to prevent peripheral electronic device from malfunctioning due to the magnetic field.

Figure 5:
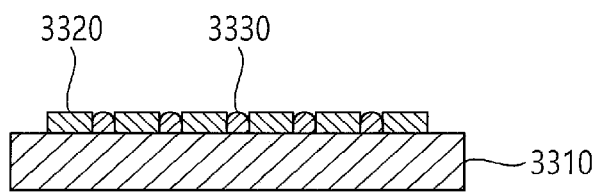
FIG. 5 is a cross-sectional view illustrating a magnetic field control member 3300 according to an embodiment of the present invention.

FIG. 5 is a cross-sectional view illustrating a magnetic field control member 3300 according to an embodiment of the present invention. Referring to FIG. 5, the magnetic field control member 3300 according to an embodiment of the present invention may include a substrate 3310, a pattern unit 3320, and a connection unit 3330. The substrate 3310 may be formed of an insulating material, and may be a Printed Circuit Board (PCB). The pattern unit 3320 may be formed of a plurality of thin films spaced apart from each other by a predetermined distance. For example, a plurality of linear thin films may be provided in a form of being arranged side by side while facing one side. The pattern unit 3320 may be formed of copper, or a mixture or a compound including copper.

Also, the thin films constituting the pattern unit 3320 may be electrically connected by the connection unit 3330. The connection unit 3330 may be configured with a solder or other conductive materials. The connection unit 3330 may be formed of one of gold, copper, and aluminum, or a mixture of two or more thereof. The connection unit 3330 may be formed of various types of conductive materials such as a thin film or a wire. Also, the connection unit 3330 may be formed over or in the substrate 3310.

Figure 6:
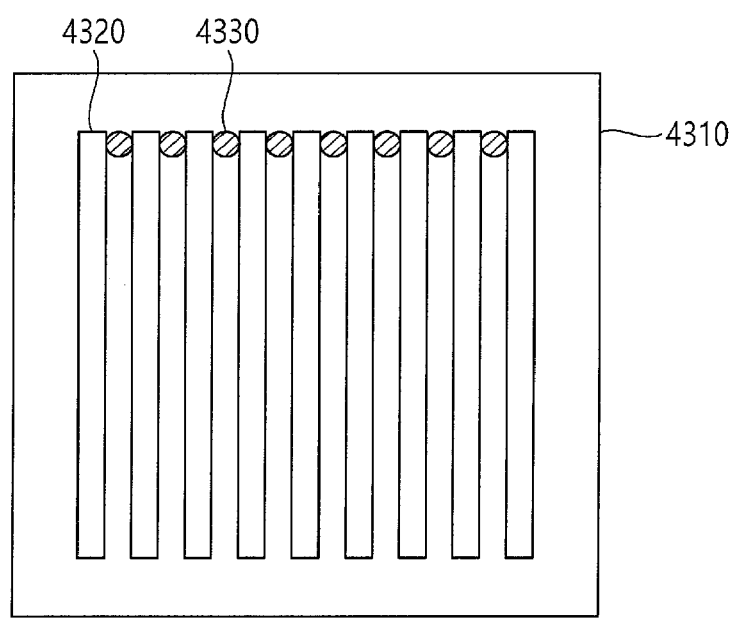
FIGS. 6 to 8 are plan views illustrating a pattern unit according to an embodiment of the present invention.
Figure 7:
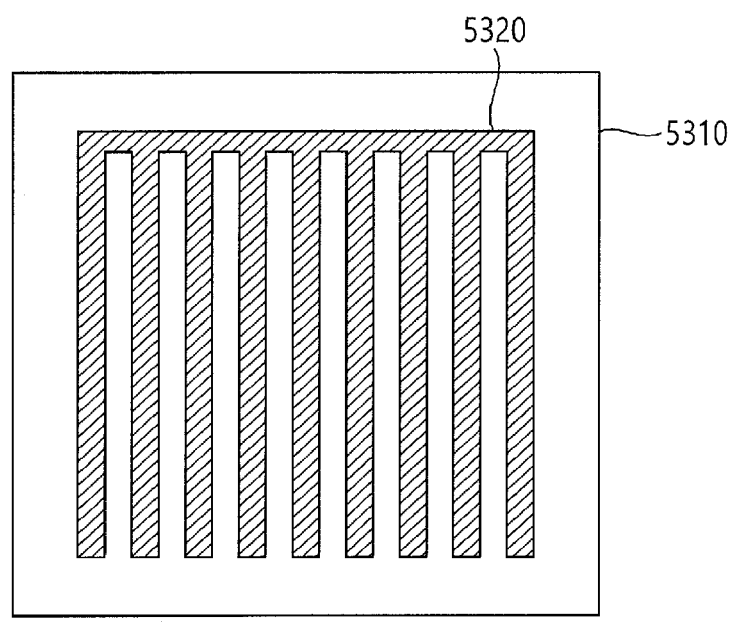
Figure 8:
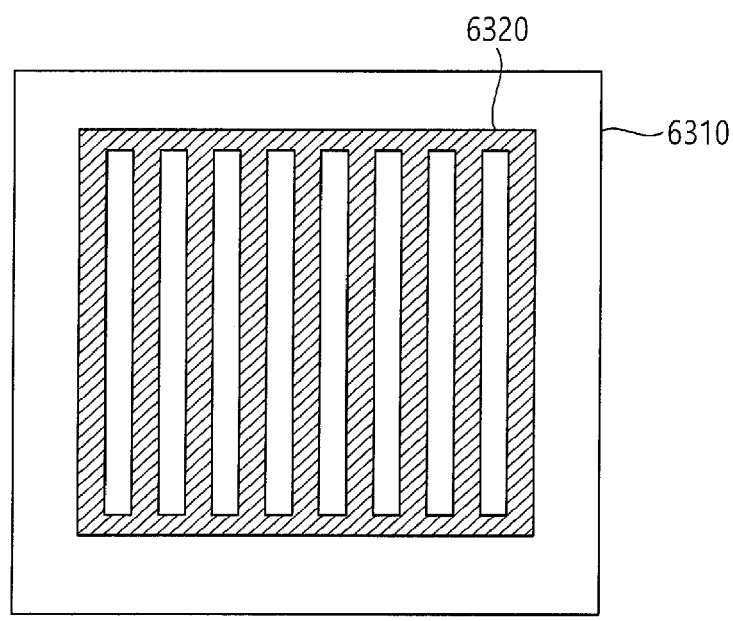

FIGS. 6 to 8 are plan views illustrating a pattern unit according to an embodiment of the present invention.

Referring to FIG. 6, a pattern unit 4320 according to an embodiment of the present invention may be provided on a substrate 4310 such that a plurality of linear thin films are disposed side by side while facing one side each other. The plurality of thin films may have the same length, and may be spaced apart from each other at the same interval. For example, the plurality of thin films may be spaced apart from each other at an interval of about 1 mm.

One ends of the thin films constituting the pattern unit 4320 may be electrically connected by a connection unit 4330. The connection unit 4330 may be formed of a solder or a conductive material, and the conductive material may be various types of conductive material such as thin film or wire. Also, the connection unit 4330 may be formed over or in the substrate 4310.

Referring to FIG. 7, a pattern unit 5320 according to an embodiment of the present invention may be provided on a substrate 5310 such that a plurality of linear thin films having the same length are disposed side by side while facing one side and one ends of the linear thin films are connected to each other and thus blocked. The linear thin films may be spaced apart from each other at the same interval, and for example, may be spaced apart from each other at an interval of about 1 mm.

Referring to FIG. 8, a pattern unit 6320 according to an embodiment of the present invention may be provided on a substrate 6310 such that a plurality of linear thin films having the same length are disposed side by side while facing one side and both ends of the linear thin films are connected to each other and thus blocked. The linear thin films may be spaced apart from each other at the same interval, and for example, may be spaced apart from each other at an interval of about 1 mm.

The magnetic field control member according to the embodiment of the present invention may be provided while being separated from the power transmitter or the power receiver, or may be provided while being coupled to the power transmitter or the power receiver.

According to the embodiments, the magnetic field generated in the primary coil may be focused on the secondary coil, and the coupling of the primary coil and the secondary coil may be improved, thereby providing a wireless charging system with reduced noise and improved efficiency.

Since the wireless power transmitting method and apparatus or the wireless power receiving apparatus and method according to an embodiment of the present invention does not necessarily include all the elements or operations, the wireless power transmitting apparatus and method and the wireless power transmitting apparatus and method may be performed with the above-mentioned components or some or all of the operations. Also, embodiments of the above-described wireless power transmitting apparatus and method, or receiving apparatus and method may be performed in combination with each other. Also, each element or operation described above is necessarily performed in the order as described, and an operation described later may be performed prior to an operation described earlier.

The description above is merely illustrating the technical spirit of the present invention, and various changes and modifications may be made by those skilled in the art without departing from the essential characteristics of the present invention. Therefore, the embodiments of the present invention described above may be implemented separately or in combination with each other.

Therefore, the embodiments disclosed in the present invention are intended to illustrate rather than limit the scope of the present invention, and the scope of the technical spirit of the present invention is not limited by these embodiments. The scope of the present invention should be construed by claims below, and all technical spirits within a range equivalent to claims should be construed as being included in the right scope of the present invention.

The invention claimed is:

1. An apparatus comprising:
   a first surface configured to face a primary coil a wireless power transmitter that generates a magnetic field;
   a second surface configured to face a secondary coil of a wireless power receiver that receives power via the magnetic field; and
   a magnetic field control member that includes a plurality of linear thin films arranged side by side on either the first surface or the second surface, wherein the magnetic field control member is configured to focus the magnetic field between the primary coil and the secondary coil.

2. The apparatus of claim 1, wherein the magnetic field control member is configured to cause the magnetic field to be focused on the secondary coil to reduce an influence of the magnetic field on parts of the wireless power receiver other than the secondary coil.

3. The apparatus of claim 1, wherein the plurality of linear thin films are spaced apart from each other by a fixed interval.

4. The apparatus of claim 3, wherein the first surface and the second surface are opposite sides of a substrate, and wherein the plurality of linear thin films is disposed on one side of the substrate.

5. The apparatus of claim 3, wherein the magnetic field control member further includes a connection unit electrically connecting the plurality of linear thin films.

6. The apparatus of claim 5, wherein the connection unit electrically connects one end of each of the plurality of linear thin films to each other.

7. The apparatus of claim 5, wherein the connection unit electrically connects both ends of the plurality of linear thin films to each other.

8. The apparatus of claim 3, wherein each of the plurality of linear thin films have a same length.

9. The apparatus of claim 3, wherein the fixed interval about 1 mm.

10. The apparatus of claim 3, wherein the plurality of linear thin films is formed of copper or a mixture or compound containing copper.

11. A wireless power transmitter comprising:
    a primary coil configured to generate a magnetic field; and
    a magnetic field control member having a first portion thereof configured to face the primary coil and a second portion thereof configured to face a secondary coil of a wireless power receiver that receives power via the magnetic field, wherein the magnetic field control member includes a plurality of linear thin films arranged side by side and is configured to focus the magnetic field between the primary coil and the secondary coil.

12. The wireless power transmitter of claim 11, wherein the magnetic field control member is configured to cause the magnetic field to be focused on the secondary coil to reduce an influence of the magnetic field on parts of the wireless power receiver other than the secondary coil.

13. The wireless power transmitter of claim 11, wherein the plurality of linear thin films are spaced apart from each other by a fixed interval.

14. The wireless power transmitter of claim 13, wherein the first portion and the second portion represent opposite sides of a substrate, and wherein the plurality of linear thin films is disposed on one side of the substrate.

15. The wireless power transmitter of claim 13, wherein the magnetic field control member further includes a connection unit electrically connecting the plurality of linear thin films.

16. A wireless power receiver comprising:
    a secondary coil configured to receive power via a magnetic field generated by a primary coil of a wireless power transmitter; and
    a magnetic field control member having a first portion thereof configured to face the primary coil and a second portion thereof configured to face the secondary coil, wherein the magnetic field control member includes a plurality of linear thin films arranged side by side and is configured to focus the magnetic field between the primary coil and the secondary coil.

17. The wireless power receiver of claim 16, wherein the magnetic field control member is configured to cause the magnetic field to be focused on the secondary coil to reduce an influence of the magnetic field on parts of the wireless power receiver other than the secondary coil.

18. The wireless power receiver of claim 16, wherein the plurality of linear thin films are spaced apart from each other by a fixed interval.

19. The wireless power receiver of claim 18, wherein the first portion and the second portion represent opposite sides of a substrate, and wherein the plurality of linear thin films is disposed on one side of the substrate.

20. The wireless power receiver of claim 18, wherein the magnetic field control member further includes a connection unit electrically connecting the plurality of linear thin films.

\* \* \* \* \*